US012591853B2

(12) United States Patent
Refford et al.

(10) Patent No.: US 12,591,853 B2
(45) Date of Patent: Mar. 31, 2026

(54) METHOD FOR COLLABORATIVE DESIGN ON CONTEXT BOUNDARIES IN MODEL-BASED TOOLS

(71) Applicant: Rockwell Collins, Inc., Cedar Rapids, IA (US)

(72) Inventors: Melinda G. Refford, Melbourne, FL (US); Loris Dal Lago, Cles (IT); Luigi Di Guglielmo, Caldiero (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/756,509

(22) Filed: Jun. 27, 2024

(65) Prior Publication Data

US 2025/0209423 A1      Jun. 26, 2025

(51) Int. Cl.
    *G06Q 10/10* (2023.01)
    *G06Q 10/101* (2023.01)

(52) U.S. Cl.
    CPC ......... *G06Q 10/103* (2013.01); *G06Q 10/101* (2013.01)

(58) Field of Classification Search
    CPC .......................... G06Q 10/103; G06Q 10/101
    USPC ......................................................... 705/301
    See application file for complete search history.

(56) References Cited

U.S. PATENT DOCUMENTS 10,922,446 B2    2/2021  Gottschlich et al.
11,023,625 B2    6/2021  Eck et al.

11,416,455 B2     8/2022   Hernandez
11,521,152 B2    12/2022   Ognev
2003/0023677 A1   1/2003   Morison Zuill et al.
2010/0115425 A1   5/2010   Bokor et al.
2012/0290943 A1  11/2012   Toney et al.
2016/0217172 A1   7/2016   Azrieli et al.
2021/0357550 A1*  11/2021  Ognev .................... G06F 30/15

(Continued)

FOREIGN PATENT DOCUMENTS

CN      113449379 A      9/2021
CN      115436891 A     12/2022

OTHER PUBLICATIONS

European Patent Office, Extended European Search Report received in EP Application No. 23425068.6, Apr. 30, 2024, 10 pages.

(Continued)

*Primary Examiner* — Jeffrey D Carlson
(74) *Attorney, Agent, or Firm* — Suiter Swantz IP

(57)                    ABSTRACT

A method for collaborative design of a system of interest (SoI) in a model-based systems engineering (MBSE) framework models the system into an artifact including customer-owned and supplier-owned portions. The customer system identifies a collaborative portion within the artifact, shared by both customer and supplier, wherein data exchanges and modifications to the SoI will take place, the collaborative portion defined by a context boundary. The customer and supplier package their respective shareable portions of the SoI into bundles including the customer-initiated collaborative portion and a supplier-owned copy. Further modifications to the SoI may be implemented via cadenced synchronization of the customer-owned and supplier-owned copies of the collaborative portion to exchange, accept, and propagate successive changes initiated by either party.

14 Claims, 7 Drawing Sheets

(56)  References Cited

U.S. PATENT DOCUMENTS

2021/0383297 A1 * 12/2021 Ognev ................... G06Q 10/10
2023/0065379 A1     3/2023 Prabhu

OTHER PUBLICATIONS

Kleiner et al., "Introducing SysML WF & IF," prostep ivip e.V., Oct. 5, 2021, 25 pages.

* cited by examiner

300

Figure 4A:
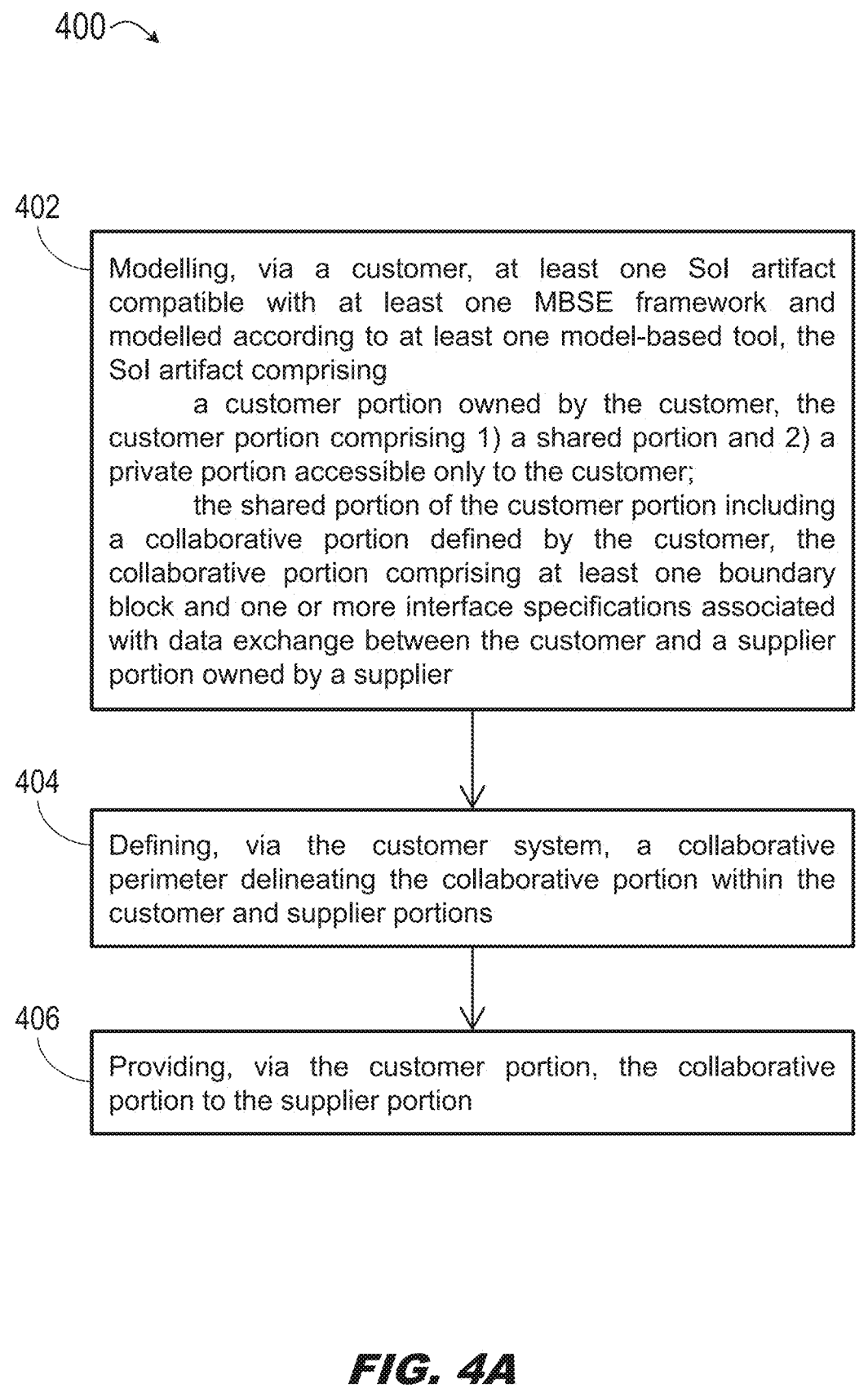

400

402

Modelling, via a customer, at least one Sol artifact compatible with at least one MBSE framework and modelled according to at least one model-based tool, the Sol artifact comprising a customer portion owned by the customer, the customer portion comprising 1) a shared portion and 2) a private portion accessible only to the customer;

the shared portion of the customer portion including a collaborative portion defined by the customer, the collaborative portion comprising at least one boundary block and one or more interface specifications associated with data exchange between the customer and a supplier portion owned by a supplier

404

Defining, via the customer system, a collaborative perimeter delineating the collaborative portion within the customer and supplier portions

406

Providing, via the customer portion, the collaborative portion to the supplier portion

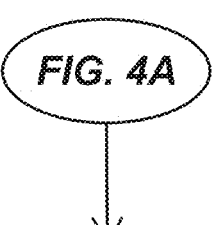

408   Organizing, via the customer, the modelled SoI artifact
into at least:
    1) a customer model based on the shared portion of
    the customer portion
    2) a set of shared interfaces configured for use by the
    customer model to communicate with the supplier
    portion, the set of shared interfaces including the one
    or more interface specifications
    3) the collaborative portion 410   Initiating, via the customer, one or more changes to the
SoI artifact by modifying the collaborative portion, each
customer-initiated change associated with at least one of
an addition to the collaborative portion, a deletion from the
collaborative portion, or a modification of the collaborative
portion 412   Synchronizing the customer-modified collaborative portion
with a supplier-copied collaborative portion

Figure 5A:
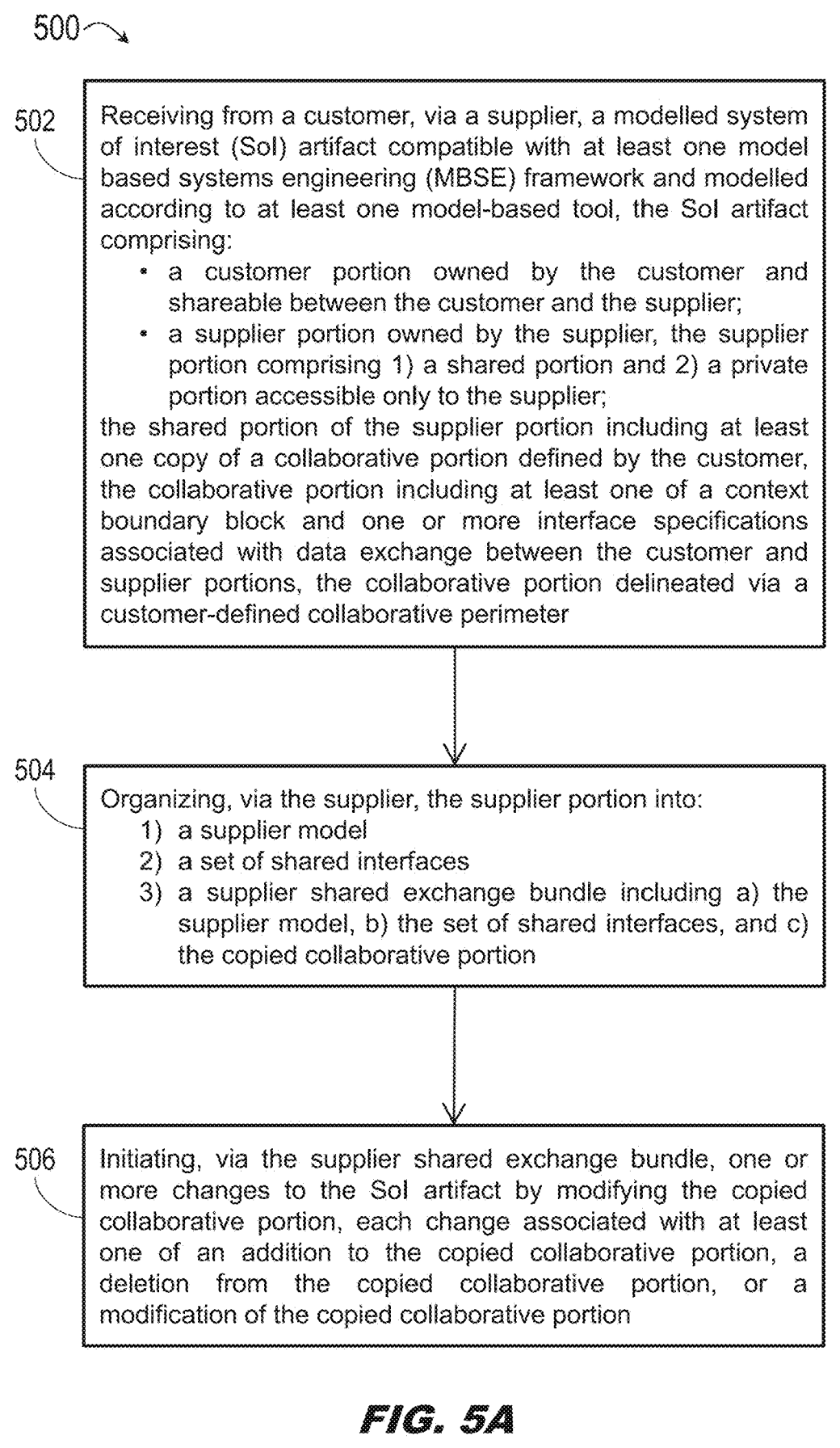

502 — Receiving from a customer, via a supplier, a modelled system of interest (SoI) artifact compatible with at least one model based systems engineering (MBSE) framework and modelled according to at least one model-based tool, the SoI artifact comprising:
- a customer portion owned by the customer and shareable between the customer and the supplier;
- a supplier portion owned by the supplier, the supplier portion comprising 1) a shared portion and 2) a private portion accessible only to the supplier;

the shared portion of the supplier portion including at least one copy of a collaborative portion defined by the customer, the collaborative portion including at least one of a context boundary block and one or more interface specifications associated with data exchange between the customer and supplier portions, the collaborative portion delineated via a customer-defined collaborative perimeter 504 — Organizing, via the supplier, the supplier portion into:
1) a supplier model
2) a set of shared interfaces
3) a supplier shared exchange bundle including a) the supplier model, b) the set of shared interfaces, and c) the copied collaborative portion 506 — Initiating, via the supplier shared exchange bundle, one or more changes to the SoI artifact by modifying the copied collaborative portion, each change associated with at least one of an addition to the copied collaborative portion, a deletion from the copied collaborative portion, or a modification of the copied collaborative portion

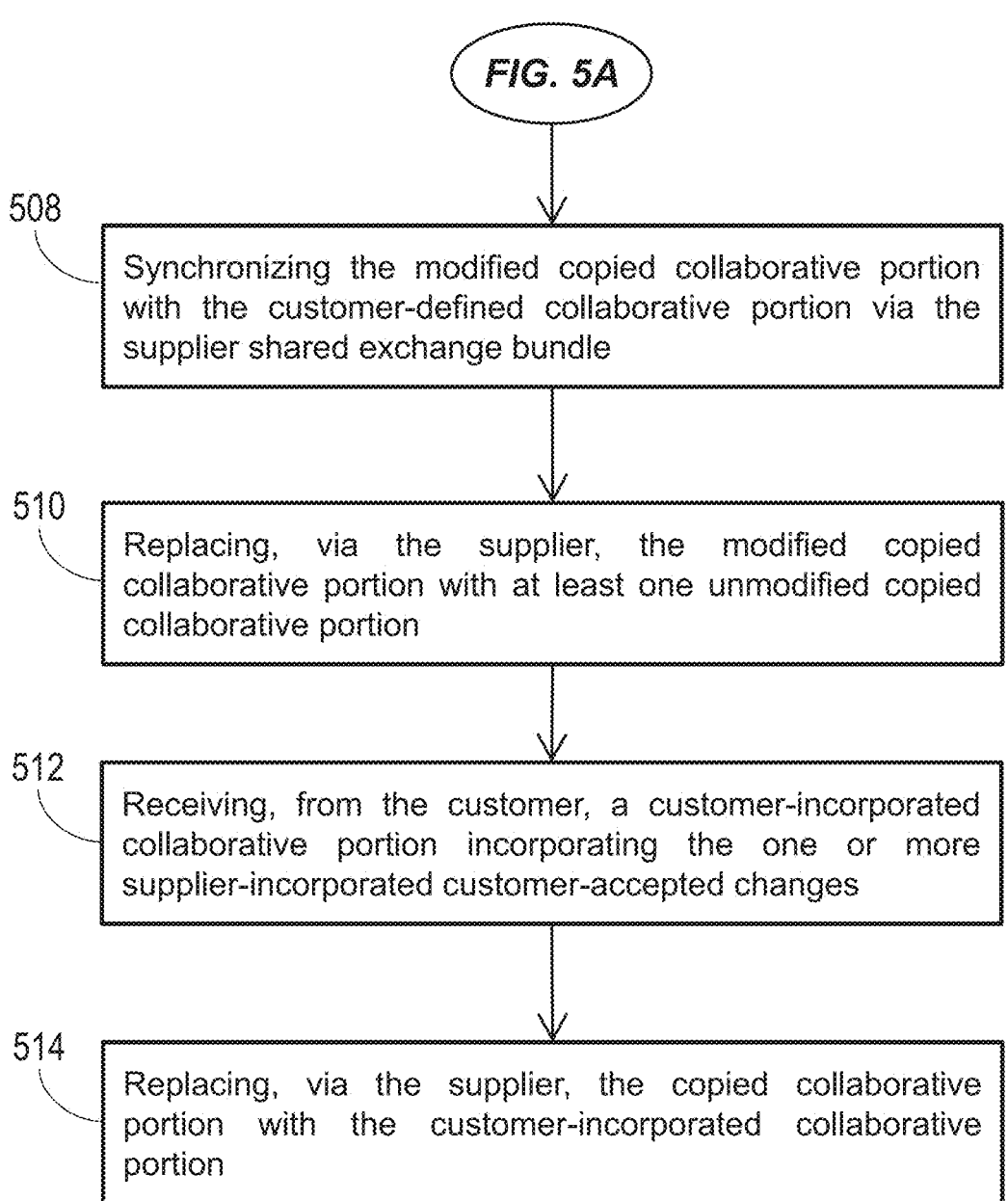

Synchronizing the modified copied collaborative portion with the customer-defined collaborative portion via the supplier shared exchange bundle

510

Replacing, via the supplier, the modified copied collaborative portion with at least one unmodified copied collaborative portion

512

Receiving, from the customer, a customer-incorporated collaborative portion incorporating the one or more supplier-incorporated customer-accepted changes

514

Replacing, via the supplier, the copied collaborative portion with the customer-incorporated collaborative portion

FIG. 5B

METHOD FOR COLLABORATIVE DESIGN ON CONTEXT BOUNDARIES IN MODEL-BASED TOOLS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

European Patent Application No. 23425068.6 filed Dec. 22, 2023 and titled METHOD FOR COLLABORATIVE DESIGN ON CONTEXT BOUNDARIES IN MODEL-BASED TOOLS.

Said European Patent Application No. 23425068.6 is herein incorporated by reference in its entirety.

BACKGROUND

When developing a structured system in a model-based systems engineering (MBSE) framework, it may be necessary to collaborate, e.g., between teams within a company, between different business units, between customers and suppliers. However, sharing structured system models between parties may not account for the fact that the parties may represent diverse interests, and that the collaborative structured system model may include trade secrets, intellectual property (IP), and other subject matter which one party may wish to maintain as private and/or conceal from their collaborative partners. Conventional approaches to packaging in model-based tools do not currently provide for identification or sharing of a context boundary.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A and 4B are flow diagrams illustrating a method for customer-side collaborative design on context boundaries according to example embodiments of this disclosure; and FIGS. 5A and 5B are flow diagrams illustrating a method for supplier-side collaborative design on context boundaries according to example embodiments of this disclosure.

DETAILED DESCRIPTION

Figure 1:
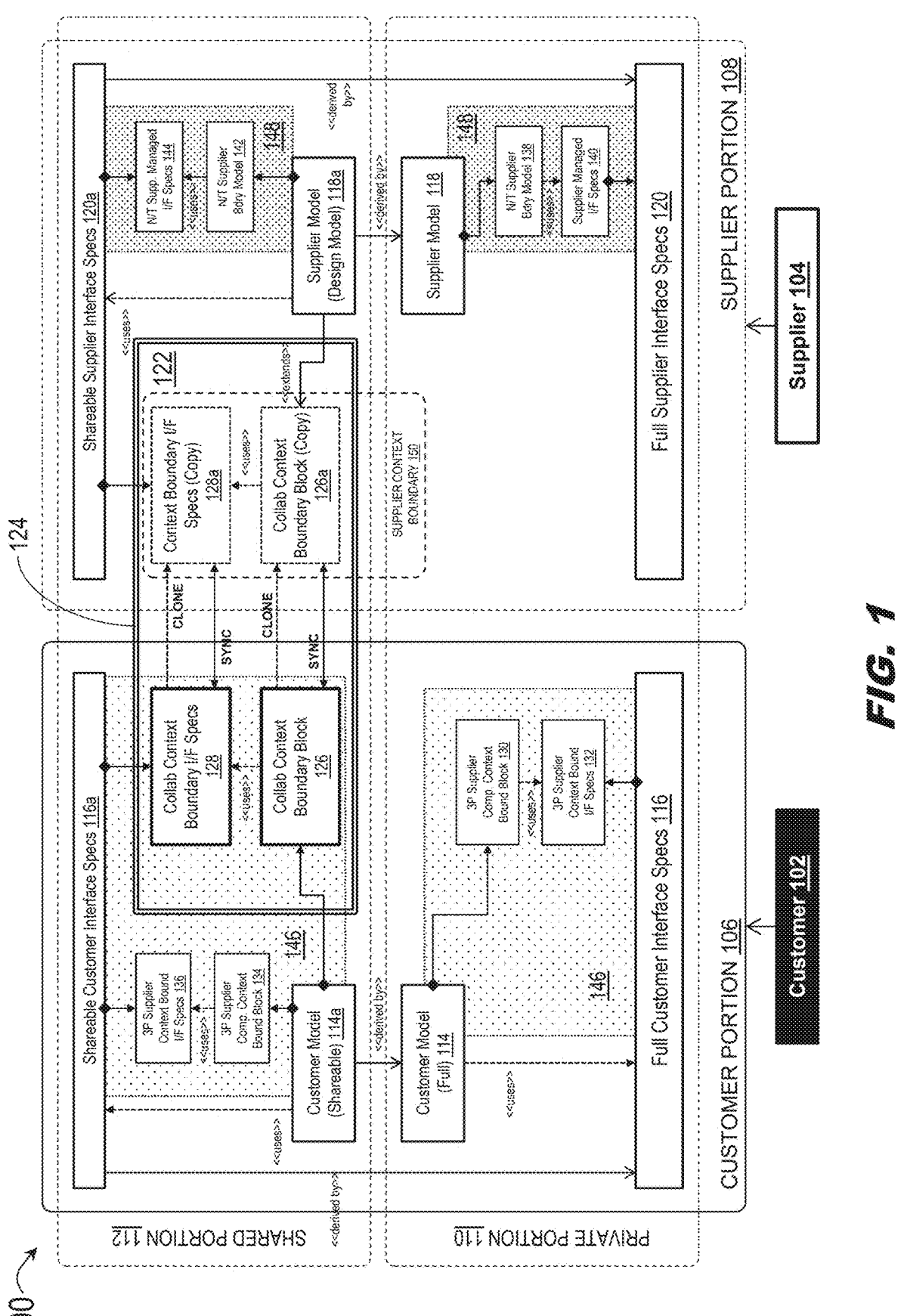
FIG. 1 is a block diagram illustrating ownership of and accessibility within a system of interest (SoI) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a method for collaborative design of structured system models in a model-based systems engineering (MBSE) framework between distinct parties (e.g., a customer and a supplier) such that each party is able to conceal sensitive content (e.g., intellectual property (IP) and other like protected content) from the other party. While methods according to the inventive concepts disclosed herein are directed to information exchanges in model-based languages via packaging and import utilities associated with model-based tools (including, but not limited to, Cameo Systems Modeler and Cameo Enterprise Architect (Dassault); Rational Rhapsody (IBM); Simulink and System Composer (MathWorks); and Enterprise Architect (Sparx Systems)), the methods are independent of, and adaptable to, any modeling framework or packaging template, provided that delineated portions of the model may be split and shared.

The methods disclosed herein provide a practical method for exchanging context boundary information in a model-based environment, the context boundary clearly delineating what is inside and what is outside a system, subsystem, or component. Further, the methods disclosed herein improve upon conventional approaches to collaborative model-based engineering by providing for separation and synchronization of packages or bundles between parties.

Referring in particular to FIG. 1, a system of interest 100 (SoI) is disclosed. In embodiments, the SoI 100 may be an artifact owned and developed by a customer 102 and a supplier 104. For example, the SoI 100 may include a customer portion 106 (e.g., customer SoI, CSoI) owned and developed by the customer 102 and a supplier portion 108 (e.g., supplier SoI, SSoI) owned and developed by the supplier 104. In embodiments, the customer 102 may develop and model the customer portion 106, and/or exchange data with the supplier 104 (e.g., and other suppliers, as noted below) via a customer exchange tool, e.g., a processing environment, computing resource, and/or data storage environment owned or controlled by the customer wherein the model-based environment is embodied. Similarly, the supplier 104 may develop the supplier portion 108 and exchange data with the customer 102 (e.g., and/or other third-party or next-tier suppliers) via a supplier exchange tool, e.g., a processing environment, computing resource, and/or data storage owned or controlled by the supplier.

In embodiments, with respect to both the customer portion 106 and supplier portion 108, the SoI 100 may be partitioned into a private portion 110 and a shared portion 112, the private portions of the customer and supplier portions independently owned and developed by the customer and the supplier respectively. For example, the private portion 110 of the customer portion 106 may include elements reserved as private by the customer 102, such as a full customer model 114 employing a full set of interface specifications 116 for use by the customer portion 106 in communicating with the supplier portion 108, or with other third-party systems, subsystems, or components of the supplier portion as discussed below. Further, the shared portion 112 of the customer portion 106 may include a shareable portion 114a of the full customer model 114 employing a shareable set of interface specifications 116a, the shareable portion 114a and the shareable set of interface specifications 116a respectively derived from the private full customer model 114 and full set of interface specifications 116.

In embodiments, the supplier portion 108 may similarly include, within its private portion 110, a full supplier model 118 (e.g., design model) employing a full set of interface specifications 120, and within its shared portion 112 a shareable SSoI supplier model 118a employing a shared set of SSoI interface specifications 120a (respectively derived from the full supplier model 118 and the full set of interface specifications 120).

In embodiments, the SoI 100 may further include a collaborative portion 122 delineated and bounded by a collaborative perimeter 124, collectively owned by the customer 102 and supplier 104. For example, the collaborative portion 122 may include a context boundary block 126 including any collaborative context, e.g., the system/s, subsystem/s, and/or component/s collaboratively defined and designed by the customer 102 and the supplier 104, and any interface specifications 128 employed by the collaborative context boundary block 126. In embodiments, the collaborative context boundary block 126 may be referred to as a 'block' in the sense that further decomposition of the context boundary block is not available to the other party.

In embodiments, the collaborative context boundary block 126 and collaborative context boundary interface specifications 128 may be initially defined in the customer portion 106 by the customer 102 and pushed to the supplier portion 108 where copies (126a, 128a) are created (e.g., via cloning of the boundary block and interface specifications). Further, once created by the customer 102 and cloned by the supplier 104, the customer portion 106 and supplier portion 108 may be synchronized as needed at a defined context boundary. For example, with respect to the customer portion 106, the collaborative context boundary block 126 and collaborative context boundary interface specifications 128 may serve as a context boundary; similarly, with respect to the supplier portion 108, the respective copies 126a, 128a of the boundary block and interface specifications 126, 128 may serve as the context boundary. In embodiments, the customer 102 and supplier 104 of the SoI 100 may collaborate to evolve their respective customer and supplier portions 106, 108, maintaining the collaborative context boundary block 126 and collaborative context boundary interface specifications 128 in synchronization with their respective copies 126a and 128a (e.g., as the customer 102 or supplier 104 add, remove, or modify interfaces, ports, and/or data flow through the interfaces or ports).

In embodiments, the SoI 100 may further include third party (3P) information (3P/supplier component context boundary block 130, 3P/supplier context boundary interface specifications 132) for use by the customer portion 106 of the SoI for communicating with the supplier portion 108 or, communicating with other systems, subsystems, or components owned by third parties which may not be interacting with the supplier portion. Further, if some or all 3P information 130, 132 must be conveyed by the customer 102 to the supplier 104, said 3P information may include a shareable subset (shareable 3P boundary block 134, shareable 3P interface specifications 136) within the shared portion 112 of the customer portion 106 and accessible to the supplier portion 108. Similarly, the supplier 104 may reserve within the private portion 110 of the supplier portion 108 elements, e.g., a next-tier (N/T) supplier boundary model 138 (e.g., boundary block) and N/T supplier managed interface specifications 140, which may be used by the supplier in communicating with other N/T suppliers, and which may be partially private to the supplier and inaccessible to the customer 102 or to other suppliers. Likewise, shareable portions of these N/T elements, e.g., a shareable N/T supplier boundary block 142 (e.g., boundary model) and shareable N/T interface specifications 144, may be made accessible to the customer 102 via the shared portion 112.

In embodiments, the 3P supplier component context boundary block 130 and 3P supplier context boundary interface specifications 132 (e.g., as well as the respective shareable portions 134, 136 thereof) may, similarly to the collaborative portion 122 and collaboration perimeter 124, serve as customer SoI context 146, e.g., with respect to collaborations by the customer 102 with said 3P suppliers. Similarly, the N/T supplier boundary model 138 and interface specifications 140, and the respective shareable portions 142, 144 thereof, may serve as supplier SoI context 148 with respect to collaborations by the supplier 104 with said N/T suppliers.

In embodiments, collaborative design according to the methods and inventive concepts disclosed herein may occur in three distinct phases. First, for example, the space within the SoI 100 wherein collaboration between the customer 102 and supplier 104 may take place (e.g., the collaborative perimeter 124 bounding the collaborative portion 122) may be identified (e.g., identified by the customer and agreed to by the supplier). Second, the SoI 100 and its component portions (e.g., the customer portion 106 and supplier portion 108) may be packaged into separate projects (e.g., such that work and ownership may be separated between the customer 102 and supplier 104; similarly, such that the lifecycles, version control, and/or other attributes of each individual package or project, may be separated). Third and finally, the collaborative perimeter 124 having been defined (e.g., initially by the customer 102), the common collaborative perimeter and definitions associated with the collaborative portion 122 bounded by the collaborative perimeter may be synchronized to maintain consistency between the customer and supplier sides of the collaborative space. For example, whenever the customer 102 or supplier 104 proposes additions, deletions, or modifications of structure (e.g., ports, interfaces) or information at the collaborative perimeter 124, the other party may be notified of any proposed changes and provided an opportunity to accept and integrate said changes, subject only to cadencing of synchronization points.

In embodiments, the identification phase may provide for initial definition of the collaborative portion 122 and collaborative perimeter 124 by the customer 102. For example, the collaborative context boundary block 126 may be used by the customer to define requirements and interfaces for data exchange with which the supplier 104 is to comply. Further, the customer portion 106 may include, but is not limited to, interface control definition (ICD) requirements, surrounding operating environment, and parameter information.

In embodiments, the customer 102 may further, during the identification phase, identify that portion of the SoI 100 (e.g., the customer SoI or CSoI) handed off to the supplier 104 as the supplier portion of the collaborative portion, delineating the handed-off or cloned portion via a supplier context boundary 150 (e.g., the supplier SoI or SSoI, including cloned versions 126a, 128a of the collaborative context boundary block 126 and collaborative context boundary interface specifications 128 respectively). For example, the supplier context boundary 150 may delineate the model design space accessible to the supplier 104 and may include any ports, interfaces, and/or data flow type information relevant to data exchanges between the supplier and customer 102. Further, the collaborative portion 122 may be considered as comprising a customer context boundary (e.g., comprising the collaborative context boundary block 126 and collaborative context boundary interface specifications 128) and the supplier context boundary 150 (e.g., comprising the cloned versions 126a, 128a thereof).

In embodiments, the larger supplier context 148 may include those elements and/or interfaces of interest owned or controlled by the customer 102 that may interact with the supplier context boundary 150 on behalf of the supplier portion 108. For example, the supplier model 118a may contain the supplier context boundary 150 (e.g., in that the cloned copies of the boundary block and interface specifications 126a, 128a may be extended by the supplier model) and may further include additional subsystems, sensors, components, or third party/next-tier supplier part information (e.g., shareable next tier supplier boundary model and interface specifications 142 and 144) to be conveyed to the customer (e.g., in the sense that the supplier model uses this third party/next tier information). Similarly, in embodiments the shareable customer model 114a would contain the customer context boundary (e.g., the collaborative context boundary block 126 and collaborative context boundary interface specifications 128) and may further include (e.g., use) shareable third-party context boundary block and interface specifications 134, 136 to be conveyed to the supplier 104.

Figure 2:
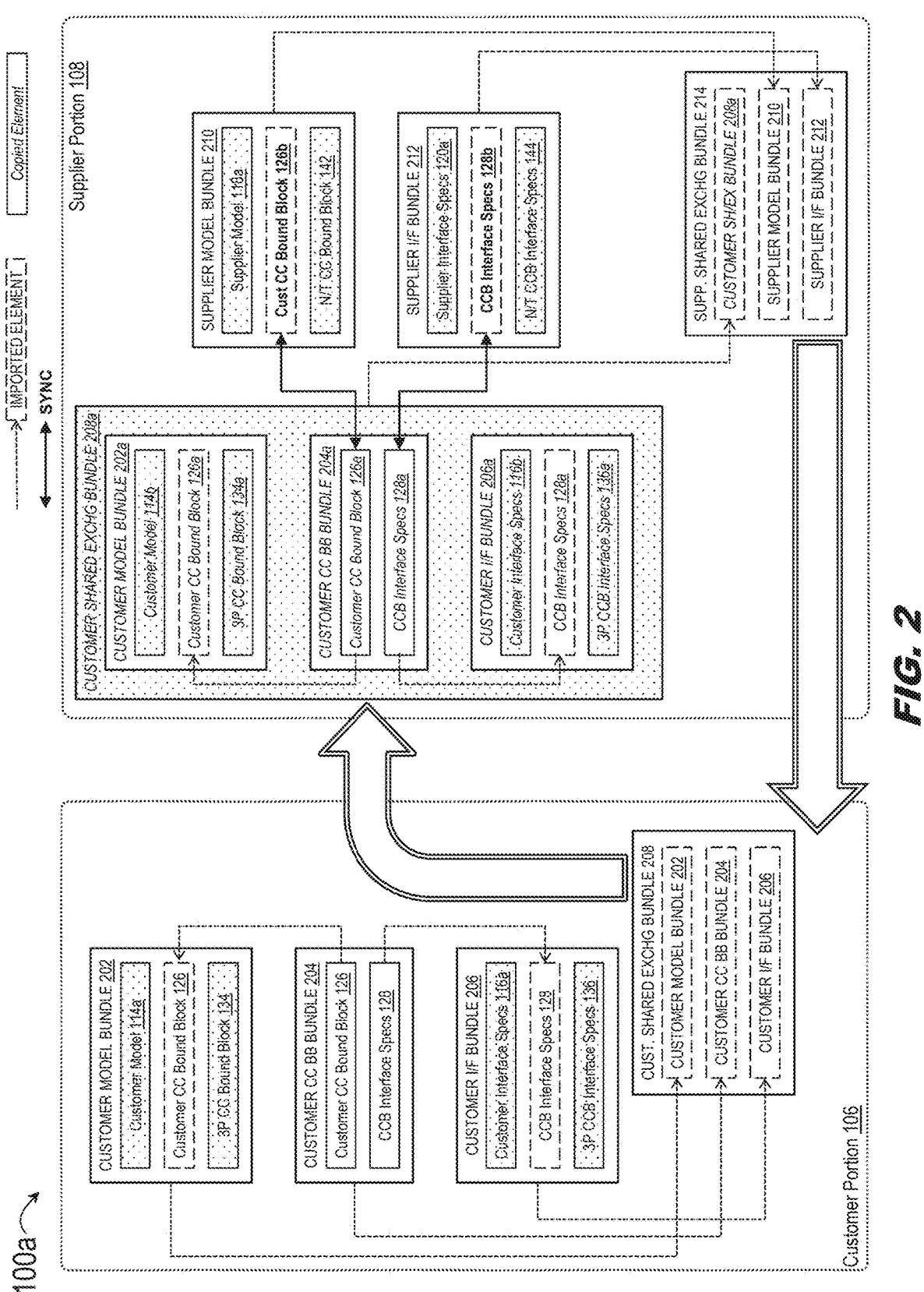
FIG. 2 is a block diagram illustrating bundling and synchronization operations within the SoI of FIG. 1.

Referring now to FIG. 2, the SoI artifact 100a may be implemented and may function similarly to the SoI artifact 100 of FIG. 1, except that the SoI artifact 100a may be organized by the customer (102, FIG. 1) and supplier (104, FIG. 1) into distinct bundles (e.g., packages) or projects according to a bundling (e.g., packaging) phase, e.g., to separate work and ownership between the customer and supplier.

In embodiments, the collaborative design process may include a bundling phase, e.g., once the collaborative portion 122 and collaboration perimeter 124 are defined according to the identification phase (as shown above by FIG. 1). For example, the SoI artifact 100a may be organized into at least a set of bundles or packages as described below (e.g., bundles owned by the customer 102 and shown within the customer portion 106, and bundles owned by the supplier 104 and included within the suppler portion 108, the set of bundles representing a minimum set of information required for the collaborative design methods disclosed herein. For example, the SoI artifact 100 may be organized into additional bundles or projects (e.g., other than those shown by the SoI artifact 100a).

In embodiments, the customer portion 106 of the SoI artifact 100a may be organized by the customer 102 into a customer model bundle 202, a customer collaborative context boundary block (CCBB) bundle 204, and a customer interface bundle 206 including interface specifications owned by the customer. For example, the customer model bundle 202 may capture any model entities concerned with design, e.g., the shared portion of the customer model 114a and third-party supplier collaborative context (CC) boundary blocks 134. With respect to these latter two items, while they may be provided to the supplier 104 it is not expected that the supplier 104 will propose changes thereto. For example, the shared portion of the customer model 114a may include at least customer-level details needed for the specification and design of the supplier portion 108, e.g., use cases, requirements, activity diagrams, traceability artifacts, architecture, and/or any interface characteristics whose modifications are under the exclusive control of the customer.

In embodiments, the CCBB bundle 204 may include the shareable model entities within the collaborative portion (122, FIG. 1) and subject to modification or update as described below, e.g., the customer CC boundary block 126 and the CC boundary interface specifications 128. For example, the customer model bundle 202 may import the customer CC boundary block (126, dotted line) so that any changes made to the CC boundary block (126, solid line) within the CCBB bundle 204 are captured and conveyed by the customer model bundle 202 as well.

In embodiments, the customer interface bundle 206 may also be owned by the customer 102 and may capture any and all model entities concerned with interfaces. For example, the customer interface bundle 206 may include the shared set of interface specifications 116a as well as any 3P or N/T supplier interface specifications 136 used by the customer portion 106. Further, the customer interface bundle 206 may import the CC boundary interface specifications (128, dotted line) from the customer model bundle 202, so that any changes to the CC boundary interface specifications (128, solid line) in the CCBB bundle 204 are likewise captured by the customer interface bundle.

In embodiments, the customer shared exchange bundle 208 may collect the three customer-portion bundles, e.g., the customer model bundle 202, the CCBB bundle 204, and the customer interface bundle 206, for access by the supplier 104. For example, the supplier 104 may copy (208a, including customer model bundle 202a (including copied customer model 114b and copied third party CC boundary blocks 134a), customer CCBB bundle 204a, customer interface bundle 206a (including copied shared customer interface specifications 116b and copied 3P supplier interface specifications 136a); italic) the customer shared exchange bundle 208 and its component bundles 202, 204, 206, e.g., for initiating changes to the customer CC boundary block 126a and CC boundary interface specifications 128a as discussed below. In embodiments, the supplier 104 may "copy" the customer shared exchange bundle 208 in that the supplier 104 may maintain a copy 208a of the baseline customer shared exchange bundle 208; the supplier may initiate changes to the copied shared exchange bundle 208a while the content of the baseline customer shared exchange bundle 208 is likewise modified by the customer. Alternatively, the supplier 104 may "copy" the customer shared exchange bundle 208 as a read-only file not modified by the supplier.

In embodiments, the supplier portion 108 of the SoI 100 may likewise be organized by the supplier 104 into supplier-owned bundles, e.g., a supplier model bundle 210 and a supplier interface bundle 212. For example, similarly to the customer model bundle 202, the supplier model bundle 210 may collect the shareable models concerned with design, e.g., the shareable portion of the supplier model 118a and any next tier (N/T) supplier CC boundary blocks 142. In both cases, it is not expected that the customer 102 propose changes to either of these models. Further, the supplier model bundle 210 may include a synchronized customer CC boundary block (126b; bold) synchronized with the copied customer CC boundary block 126a within the copied customer shared exchange bundle 208a and to which the supplier 104 may initiate changes modifying the shared context boundary.

In embodiments, the supplier interface bundle 212, similarly to the customer-portion customer interface bundle 206, may collect any and all model entities concerned with interfaces. For example, the supplier interface bundle 212 may include shareable supplier interface specifications 120a as well as next-tier CC boundary interface specifications 144 (neither of which the customer 102 is expected to initiate changes to). Further, the supplier interface bundle 212 may include a synchronized set of CC boundary interface specifications 128b synchronized with the CC boundary interface specifications 128a within the customer shared exchange bundle 208a. In embodiments, changes initiated by the supplier 104 to the synchronized CC boundary interface specifications 128b may likewise modify the shared context boundary.

In embodiments, the supplier shared exchange bundle 214 may organize the bundles within the supplier portion 108 (e.g., the copied customer shared exchange bundle 208a, the supplier model bundle 210, and the supplier interface bundle 212) for access by the customer 102.

Figure 3:
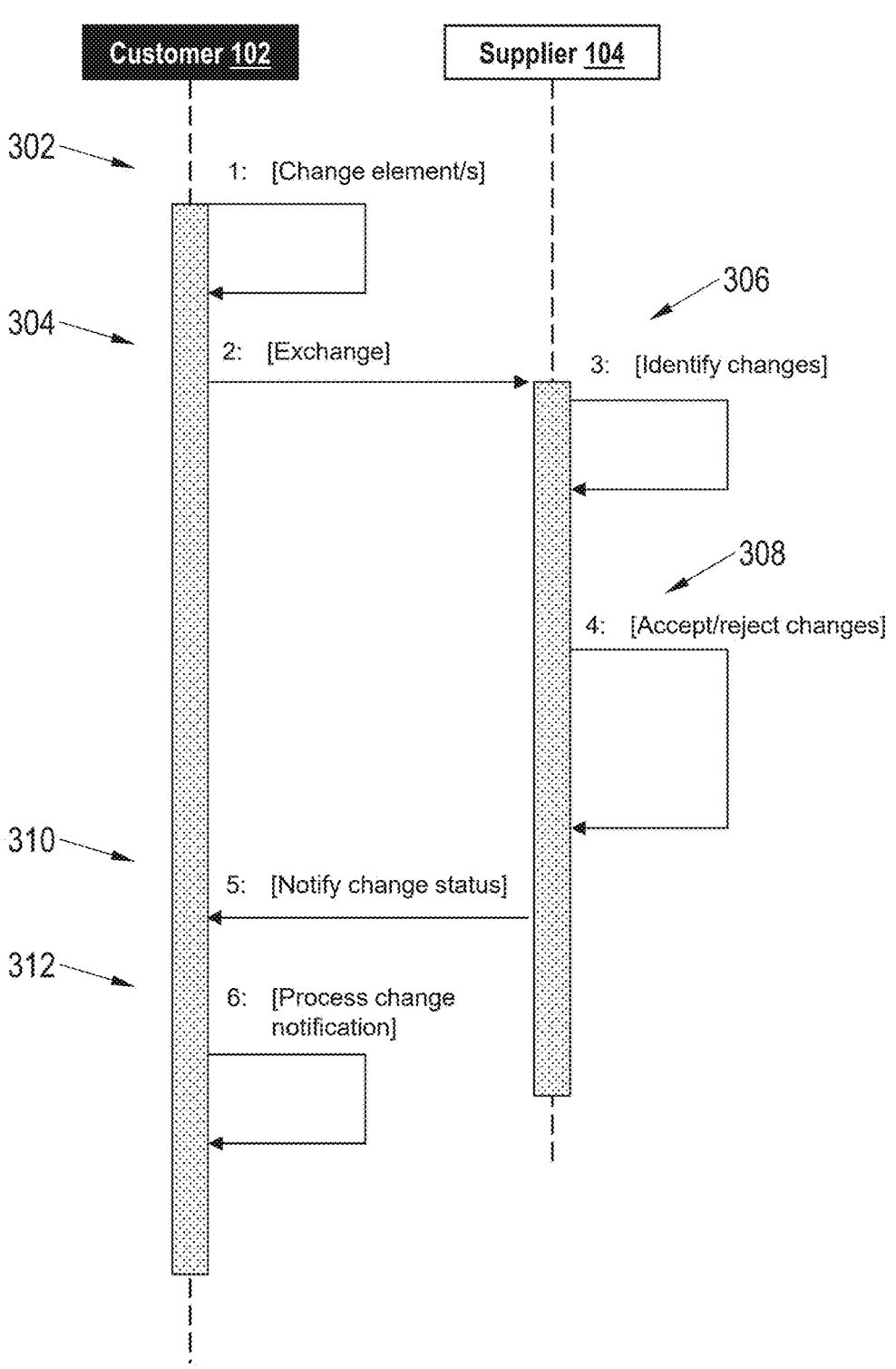
FIG. 3 is a diagrammatic illustration of synchronization operations within the SoI of FIG. 1.

Referring now to FIG. 3, the sequence 300 represents the steps of a synchronization phase between the supplier 104 and customer 102, e.g., based on modifications initiated by the customer to the supplier context boundary (150, FIG. 1) as initially defined by the customer (e.g., specifically the collaborative context boundary block 126 and/or collaborative context shared interface specifications 128). It may be noted that the sequence 300 may likewise be applied to a synchronization based on modifications or changes initiated by the supplier 104 and exchanged with the customer 102 as described below.

In embodiments, the sequence 300 may include a first step 302 wherein the customer 102 (i.e., initiating party) changes or modifies one or more elements within the supplier context boundary 150 of the bundled SoI artifact (100a, FIG. 2). For example, the customer may initiate revisions (e.g., additions, deletions, changes) to one or more of the CC boundary block 126 or CC boundary interface specifications 128. For example, any changes initiated in the CC boundary block 126 and/or CC boundary interface specifications 128 (e.g., within the customer CCBB bundle (204, FIG. 2) may be imported into the customer model bundle 202 and customer interface bundle 206 respectively. Further, the customer shared exchange bundle 208 may likewise be updated with the current versions of the customer model bundle 202, customer CCBB bundle 204, and customer interface bundle 206.

At a second step 304 of the sequence 300, the updated or modified elements may reach the supplier 104 (e.g., the receiving party) via the transferred/transmitted customer shared exchange bundle 208, e.g., according to cadenced sharing policies. For example, the supplier 104 may copy (208a) the customer shared exchange bundle 208 and its component bundles into the supplier portion 108 as described above.

At a third step 306 of the sequence 300, the supplier 104 may initiate a mechanism for change identification such that all modifications initiated by the customer 102 and exchanged with the are identified. For example, the supplier 104 may import the copied customer shared exchange bundle 208a into the supplier shared exchange bundle 214 (which, as noted above, also imports the supplier model bundle 210 and supplier interfaces bundle 212). Further, the supplier 104 may compare the imported customer shared exchange bundle 208a (which includes customer-initiated changes to the copies 126a, 128a of the customer CC boundary block 126 and CC boundary interface specifications 128) and the supplier model bundle 210 and supplier interface bundle 212 (which respectively include the syn-chronized CC boundary block 126b and synchronized CC boundary interface specifications 128b) to identify specific customer-initiated changes to the copied customer CC boundary block 126a and CC boundary interface specifications 128a.

At a fourth step 308 of the sequence 300, the supplier 104 accepts or rejects each identified change, indicating the status of each identified change (accepted or rejected) for propagation to the customer 102. For example, with respect to any customer-initiated changes accepted by the supplier 104, the supplier may synchronize the CC boundary block 126b (within the supplier model bundle 210) and CC boundary interface specifications 128b (within the supplier interface bundle 212) to propagate accepted changes from the copies 126a, 128a received from the customer 102 (and ignore rejected changes therefrom). Further, the supplier 104 may update the supplier shared exchange bundle 214 by importing updated versions of the supplier model bundle 210 and supplier interface bundle 212 (which reflect changes both initiated by the customer 102 and accepted by the supplier 104).

At a fifth step 310 of the sequence 300, the supplier 104 propagates back to the customer 102 notification of the status (accepted, rejected) of each proposed modification or change. For example, the supplier 104 may transfer/transmit the updated supplier shared exchange bundle 214 to the customer 102. Further, the customer 102 may compare the synchronized CC boundary block 126b and synchronized CC boundary interface specifications 128b received respectively via the supplier model bundle 210 and supplier interface bundle 212 included in the supplier shared exchange bundle 214 (and incorporating changes initiated by the customer and accepted by the supplier 104) to the customer CC boundary block 126 and CC boundary interface specifications 128 in order to verify accepted changes and identify any other differences between the CC boundary block and interface specifications last shared with the supplier 104 and evolved versions of the CC boundary block and interface specifications in the customer portion 106.

At a sixth and final step 312 of the sequence 300, the customer 102 may assent to and propagate the accepted changes received from the supplier 104. For example, the supplier 104 may remove all initiated changes from the synchronized collaborative context boundary block 126b and/or synchronized collaborative context interface specifications 128b, reverting to the original unmodified copies 126a/128a thereof as received via the customer shared exchange bundle 208. The supplier 104 may then import and copy a new customer shared exchange bundle 208 incorporating (e.g., via the customer CCBB bundle 204) any changes initiated by the customer 102, accepted by the supplier, and assented to by the customer. In some embodiments, the customer 102 may disagree with or decline the set of customer-initiated changes accepted and possibly updated by the supplier 104. For example, the customer 102 may initiate a new sequence 300, e.g., via collecting and transferring/transmitting to the supplier 104 a new customer shared exchange bundle 208 incorporating updated or additional changes to the CC boundary block 126 and/or CC boundary interface specifications 128 (e.g., as found within the customer CCBB bundle 204).

In embodiments, the sequence 300 may be initiated by either the supplier 104 or the customer 102 at any time, including as a response by the non-initiating party (e.g., as noted above with respect to step 310) or in conjunction with a cadenced exchange. For example, one or more changes initiated by one party (e.g., per step 302) may trigger responsive changes initiated by the other party.

In embodiments, changes initiated by one party and accepted and processed by the other party according to the sequence 300 may be propagated via mechanisms of automatic property propagation, e.g., inheritance mechanisms in SysML environments.

Referring now to FIG. 4A, the computer-implemented method 400 may be implemented by the customer (102, FIG. 1) via a customer model generated via capturing a system of interest (SoI) and may include the following steps.

At a step 402, the customer models a system of interest (SoI) artifact via model-based tools (and compatible with an MBSE framework of reference) configured for execution within a processing environment (e.g., one or more processors, multi-core processing environment incorporating physical or virtual processing cores, memory and/or data storage) or any appropriate computing resource. The SoI artifact includes a customer portion/customer SoI (CSoI)

including shared and private portions (the private portions accessible only to the customer and/or customer system), a supplier portion/supplier SoI (SSoI) likewise including shared and private portions, and a collaborative portion within the customer portion and initially defined by the customer, the collaborative portion including boundary blocks and interface specifications for data exchange between the customer and supplier portions.

At a step 404, the customer defines a collaborative perimeter delineating which subsystems or components of the customer portion are within, or outside, the collaborative portion.

At a step 406, the customer provides the collaborative portion (e.g., collaborative context boundary blocks and shared interfaces) to the supplier for copying by the supplier, so that further modifications may be implemented via synchronization of both sets (e.g., original and copy) of collaborative portions.

Referring also to FIG. 4B, at a step 408, the customer organizes the customer portion of the modelled SoI artifact into bundles or projects. For example, the customer-owned bundles based on the SoI artifact include a customer model based on the shared portion of the customer portion (e.g., that portion accessible to both customer and supplier/s) and including the customer-defined collaborative portion and collaborative perimeter (copied by the supplier). The customer-owned bundles further include a set of shared interfaces which the customer model uses to communicate with supplier-owned packages via the collaborative portion. In some embodiments, the customer-owned bundles additionally include a shared exchange bundle (e.g., combining the customer model, shared interfaces, and collaborative portion and shared with the supplier). In some embodiments, the customer model additionally includes boundary models or blocks owned by parties other than the customer or supplier (e.g., third-party or next-tier suppliers) but shareable between the customer and supplier, even though the supplier may not directly interact with the third-party or next-tier owner.

At a step 410, the customer initiates one or more proposed changes to the SoI artifact via the collaborative portion (e.g., the boundary block and/or interface specification components thereof). For example, the proposed changes may include one or more of an addition to the collaborative portion, a deletion from the collaborative portion, or some other modification of the collaborative portion. Said proposed modifications to the collaborative portion may be reflected in the customer model (which imports the modified boundary block) and/or the shared exchange bundle (which imports the modified collaborative portion, the customer model, and the shared interfaces).

At a step 412, the customer (e.g., in conjunction with the supplier) synchronizes the customer-defined collaborative portion (including any proposed changes initiated by the customer) with the supplier-copied collaborative portion. For example, as noted above, the customer may initiate changes to the SoI, the proposed changes reflected in an updated collaborative portion (e.g., adding/deleting ports or interfaces, modifying information exchanged via said ports/interfaces or parameters governing said data exchange), the modified collaborative portion imported within the shared exchange bundle. The proposed changes may be accepted or rejected by the supplier, from whom the customer receives a modified collaborative portion incorporating any accepted changes (e.g., via a supplier shared exchange bundle including further modifications to the customer-modified boundary block and shared interfaces). The customer provides (e.g., via an updated customer shared exchange bundle) a revised collaborative portion incorporating these consumer-initiated/supplier-accepted changes and provides the revised collaborative portion back to the supplier (e.g., so accepted changes may be propagated by the supplier as well as the customer). In some embodiments, the customer receives a modified collaborative portion including changes proposed by the supplier. For example, in response to customer-initiated changes the supplier may reject these changes and initiate a new synchronization cycle based on supplier-initiated changes. The customer accepts or rejects the proposed changes and provides the supplier with a revised collaborative portion incorporating the accepted changes.

Referring now to FIG. 5A, the computer-implemented method 500 may be implemented by the supplier (104, FIG. 1) and may include the following steps. Similarly, to the method 400, the method 500 may be implemented via a processing environment or computing resource as described above.

At a step 502, the supplier receives from a customer a modelled system of interest (SoI) artifact including a customer portion/customer SoI (CSoI) (e.g., a portion of the CSoI shared by the customer with the supplier), a supplier portion/supplier SoI (including a shareable portion), the customer portion further including a collaborative portion initially defined by the customer, the collaborative portion including boundary blocks and interface specifications for data exchange between the customer and supplier portions. The collaborative portion within the customer portion is delineated by a collaborative perimeter initially defined by the customer. In embodiments, the supplier imports the collaborative portion (e.g., via a customer-owned shared exchange bundle) so that changes within the collaborative perimeter may be propagated between the customer and supplier copies of the collaborative portion.

At a step 504, the supplier (e.g., in conjunction with the customer) organizes the supplier portion into supplier-owned bundles. For example, a design model is based on interface specifications provided by the collaborative portion of the customer portion and includes a supplier model as well as private interfaces not accessible to the customer. Further, a shared exchange bundle owned by the supplier includes the supplier model, interface specifications for use by the customer in data exchanges with the supplier-owned packages at the context boundary, and an imported customer-owned shared exchange bundle (e.g., initially received from the customer and including a customer model and customer-owned shared interfaces, as well as a copy of the collaborative portion). In some embodiments, the supplier-owned bundles additionally include boundary blocks or interface specifications owned by third parties or next-tier suppliers which whom the supplier may communicate and/or exchange, the boundary blocks/interface specifications shareable with the customer even though the customer may not directly interact with the third parties or next-tier suppliers.

At a step 506, the supplier initiates one or more proposed changes to the SoI via the collaborative portion, e.g., to its imported copies of the boundary block and interface specifications. For example, the proposed changes may include one or more of an addition to the copied collaborative portion, a deletion from the copied collaborative portion, or some other modification of the copied collaborative portion. In some embodiments, changes initiated by the supplier may trigger changes initiated by the customer, which may be forwarded to the supplier for acceptance or rejection.

Referring also to FIG. 5B, at a step 508 the supplier (e.g., in conjunction with the customer) synchronizes the customer-initiated collaborative portion and the supplier-modified copy of the collaborative portion via the shared exchange bundles (i.e., supplier-owner and customer-owned). For example, the supplier may initiate changes to the copied collaborative portion and provide the modified copied collaborative portion (incorporating initiated changes) to the customer via the supplier model and interface specifications imported by the supplier-owned shared exchange bundle and shared with the consumer. The customer accepts or rejects each change, providing the supplier (via subsequent update to the customer-owned shared exchange bundle) with a customer-modified collaborative portion incorporating any customer-accepted changes. If the supplier assents to the revised changes, the supplier provides the customer (again via the supplier-owned shared exchange bundle) with an updated collaborative portion incorporating all changes initiated by the supplier, accepted by the customer, and assented to by the supplier. The supplier then reverts its copy of the collaborative portion to the last copy received from the consumer, subsequently receiving an updated collaborative portion (likewise incorporating mutually accepted changes) from the customer (e.g., via the updated imported customer-owned shared exchange bundle). Alternatively, the customer may reject all changes initiated by the supplier, and initiate a new synchronization cycle by proposing its own changes.

Referring also to FIG. 5B, the method 500 may include additional steps 510 through 514.

At the step 510, after providing incorporated accepted supplier-initiated changes to the customer (e.g., via a modified copy of the collaborative portion), the supplier removes any accepted changes or modifications from its copy of the collaborative portion, reverting the modified copy of the collaborative portion (e.g., within the supplier model) to the original (e.g., most recently imported from the consumer) supplier copy of the collaborative portion.

At the step 512, the supplier receives an updated collaborative portion from the customer via the imported (e.g., customer-owned) shared exchange bundle, the updated collaborative portion incorporating any changes initiated by the supplier and accepted by the customer.

At the step 514, the supplier propagates accepted changes through the supplier model (e.g., adding or reconnecting connections and/or lower-level design elements) based on the updated customer-owned shared exchange bundle received from the customer (e.g., and the updated collaborative portion contained therein incorporating accepted supplier-initiated changes). Further, the supplier updates its copied collaborative portion (e.g., within the supplier model) to reflect customer-accepted changes to the collaborative portion as received via the most recent shared exchange bundle imported from the customer.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A computer-implemented method collaborative sharing of context boundary information in a model-based environment, the method comprising:

modelling, via a customer, at least one system of interest (SoI) artifact compatible with at least one model-based systems engineering (MBSE) framework and modelled according to at least one model-based tool, the SoI artifact comprising:

a customer portion owned by the customer, the customer portion comprising 1) a shared portion and 2) a private portion accessible only to the customer;

the shared portion of the customer portion including a collaborative portion defined by the customer, the collaborative portion comprising at least one context boundary block and one or more interface specifications associated with data exchange between the customer and a supplier portion of the SoI artifact, the supplier portion owned by a supplier;

defining, via the collaborative portion, a collaborative perimeter delineating the collaborative portion within the shared portion of the customer and supplier portions;

providing, via the customer portion, the collaborative portion to the supplier portion;

organizing, via the customer, the at least one modelled SoI artifact into at least:

1) A customer model based on the shared portion of the customer portion;

2) A set of shared interfaces configured for use by the customer model to communicate with the supplier portion, the set of shared interfaces including the one or more interface specifications;

and

3) The collaborative portion;

initiating, via the customer, one or more changes to the SoI artifact by modifying the collaborative portion, each customer-initiated change associated with at least one of an addition to the collaborative portion, a deletion from the collaborative portion, or a modification of the collaborative portion;

and synchronizing the customer-modified collaborative portion with a supplier-copied collaborative portion received from the supplier.

2. The computer-implemented method of claim 1, wherein synchronizing the customer-modified collaborative portion with a supplier-copied collaborative portion includes:

providing, via the collaborative portion, the one or more customer-initiated changes to the supplier;

receiving, from the supplier and via the collaborative portion, one or more accepted changes of the one or more customer-initiated changes;

incorporating the one or more accepted changes into the collaborative portion;

and providing, via the customer-incorporated collaborative portion, the one or more accepted changes to the supplier.

3. The computer-implemented method of claim 1, wherein synchronizing the collaborative portion with a supplier-copied collaborative portion includes:

receiving from the supplier, via the supplier-copied collaborative portion, one or more supplier-initiated changes to the SoI artifact;

accepting, via the customer, one or more of the supplier-initiated changes;

incorporating, via the collaborative portion, the one or more accepted supplier-initiated changes;

and providing, via the customer-incorporated collaborative portion, the one or more accepted supplier-initiated changes to the supplier.

4. The computer-implemented method of claim 3, wherein accepting, via the customer, one or more of the supplier-initiated changes includes:

accepting at least one first supplier-initiated change;

or rejecting at least one second supplier-initiated change.

5. The computer-implemented method of claim 1, wherein organizing, via the customer, the at least one modelled SoI artifact into at least 1) a customer model; 2) the set of shared interfaces; and 3) the collaborative portion includes:

organizing, via the customer, the at least one modelled SoI artifact into 3) a customer shared exchange bundle shared with the supplier, the shared exchange bundle comprising the customer model, the set of shared interfaces, and the collaborative portion.

6. The computer-implemented method of claim 5, wherein synchronizing the customer-modified collaborative portion with a supplier-copied collaborative portion includes:

synchronizing the customer-modified collaborative portion with a supplier-copied collaborative portion via the customer shared exchange bundle.

7. The computer-implemented method of claim 1, wherein:

the customer model includes at least one third-party context boundary block owned by a third party other than the customer and the supplier;

and the set of shared interfaces include at least one set of third-party interface specifications configured for use by the customer to communicate with the third party via the at least one third-party context boundary block.

8. A computer-implemented method for collaborative sharing of context boundary information in a model-based environment, the method comprising:

receiving from a customer, via a supplier, a modelled system of interest (SoI) artifact compatible with at least one model-based systems engineering (MBSE) framework and modelled according to at least one model-based tool, the SoI artifact comprising:

a customer portion owned by the customer and shareable between the customer and the supplier;

a supplier portion owned by the supplier, the supplier portion comprising 1) a shared portion and 2) a private portion accessible only to the supplier;

the shared portion of the supplier portion including at least one copy of a collaborative portion defined by the customer, the collaborative portion including at least one of a context boundary block and one or more interface specifications associated with data exchange between the customer and supplier portions, the collaborative portion delineated within the shared portion of the customer and supplier portions via a customer-defined collaborative perimeter;

organizing, via the supplier, the modeled supplier artifacts into at least:

1) A supplier model;

2) A set of shared interfaces; and

3) A supplier shared exchange bundle comprising a) the supplier model; b) the set of shared interfaces; and c) the copied collaborative portion;

initiating, via the supplier shared exchange bundle, one or more changes to the SoI artifact by modifying the copied collaborative portion, each change associated with at least one of an addition to the copied collaborative portion, a deletion from the copied collaborative portion, or a modification of the copied collaborative portion; and synchronizing the modified copied collaborative portion with the customer-defined collaborative portion via the supplier shared exchange bundle.

9. The computer-implemented method of claim 8, wherein synchronizing the modified copied collaborative portion with the customer-defined collaborative portion via the supplier shared exchange bundle includes:

providing, via the supplier shared exchange bundle, the modified copied collaborative portion to the customer;

receiving, via a customer-modified collaborative portion, one or more customer-accepted changes of the one or more supplier-initiated changes;

incorporating, via the supplier, the one or more customer-accepted changes by modifying the copied collaborative portion; and providing, via the supplier shared exchange bundle, the one or more supplier-incorporated customer-accepted changes to the customer.

10. The computer-implemented method of claim 9, further comprising:

replacing, via the supplier, the modified copied collaborative portion with at least one unmodified copied collaborative portion;

receiving, from the customer, a customer-incorporated collaborative portion incorporating the one or more supplier-incorporated customer-accepted changes; and replacing, via the supplier, the at least one unmodified copy of the collaborative portion with the customer-incorporated collaborative portion.

11. The computer-implemented method of claim 8, wherein synchronizing the modified copied collaborative portion with the customer-defined collaborative portion via the supplier shared exchange bundle includes:

receiving a customer-modified collaborative portion from the customer, the customer-modified collaborative portion including one or more customer-initiated changes to the SoI artifact;

accepting one or more of the one or more customer-initiated changes;

producing, via the supplier, a supplier-incorporated copied collaborative portion incorporating the one or more accepted customer-initiated changes; and providing, via the supplier shared exchange bundle, the supplier-incorporated copied collaborative portion to the customer.

12. The computer-implemented method of claim 11, further comprising:

replacing, via the supplier shared exchange bundle, the supplier-incorporated copied collaborative portion with an unmodified copied collaborative portion;

receiving, from the customer, a customer-incorporated collaborative portion incorporating the one or more accepted changes; and replacing, via the supplier shared exchange bundle, the unmodified copied collaborative portion with the customer-incorporated collaborative portion.

13. The computer-implemented method of claim 11, wherein accepting one or more of the one or more customer-initiated changes includes:

accepting at least one first customer-initiated change; or rejecting at least one second customer-initiated change.

14. The computer-implemented method of claim 8, wherein:

the supplier model includes at least one third-party context boundary block owned by a third party other than the customer and the supplier; and the set of shared interfaces includes at least one set of third-party interfaces configured for use by the supplier to communicate with the third party via the at least one third-party context boundary block.

* * * * *